(12) United States Patent
Boehm

(10) Patent No.: US 10,195,995 B2
(45) Date of Patent: *Feb. 5, 2019

(54) VEHICLE VISION SYSTEM HAVING ADJUSTABLE DISPLAYED FIELD OF VIEW

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,421

(22) Filed: Aug. 25, 2017

(65) Prior Publication Data

US 2018/0065556 A1 Mar. 8, 2018

Related U.S. Application Data

(63) Continuation of application No. 14/978,635, filed on Dec. 22, 2015, now Pat. No. 9,744,907.

(Continued)

(51) Int. Cl.
*B62D 25/00* (2006.01)
*B60R 1/08* (2006.01)
(Continued)

(52) U.S. Cl.
CPC .............. *B60R 1/08* (2013.01); *B60R 1/00* (2013.01); *B60R 1/12* (2013.01); *H04N 5/23293* (2013.01);
(Continued)

(58) Field of Classification Search
CPC .... B60R 1/08; B60R 1/00; B60R 1/12; B60R 2001/1215; B60R 2001/1253;
(Continued)

(56) References Cited

U.S. PATENT DOCUMENTS 2,131,888 A 10/1938 Harris
2,632,040 A 3/1953 Rabinow
(Continued)

FOREIGN PATENT DOCUMENTS

EP 0513476 11/1992
EP 2378350 B1 12/2003
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

(Continued)

*Primary Examiner* — Sathyanaraya V Perungavoor
*Assistant Examiner* — Howard D Brown, Jr.
(74) *Attorney, Agent, or Firm* — Price Heneveld LLP; Bradley D. Johnson

(57) ABSTRACT

A vision system for a vehicle is provided including a camera for capturing images within a field of view; a display device movably mounted relative to the vehicle for displaying a portion of the field of view of the camera; a movement sensor for sensing movement of the display device; and a processing circuit in communication with the movement sensor, the display device, and the camera for selecting the portion of the field of view to be displayed on the display device in response to movement of the display device as sensed by the movement sensor.

19 Claims, 5 Drawing Sheets

Related U.S. Application Data

(60) Provisional application No. 62/097,315, filed on Dec. 29, 2014.

(51) Int. Cl.
*H04N 5/232* (2006.01)
*B60R 1/12* (2006.01)
*B60R 1/00* (2006.01)

(52) U.S. Cl.
CPC ............ *B60R 2001/1215* (2013.01); *B60R 2001/1223* (2013.01); *B60R 2001/1253* (2013.01); *B60R 2300/30* (2013.01); *B60R 2300/70* (2013.01); *B60R 2300/8046* (2013.01)

(58) Field of Classification Search
CPC ........ B60R 2300/70; B60R 2300/8046; B60R 2001/1223; B60R 2300/30; H04N 5/23293
See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,793,308 A | 8/1998 | Rosinski et al. |
| 5,793,420 A | 8/1998 | Schmidt |

(56) References Cited

U.S. PATENT DOCUMENTS

| | | |
|---|---|---|
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,278,377 B1 * | 8/2001 | DeLine ............ B60R 1/12 340/425.5 |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Avionique et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,975 B1 * | 7/2002 | DeLine ............ B60R 1/12 340/425.5 |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takashashi |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |

(56) References Cited

U.S. PATENT DOCUMENTS

| | | |
|---|---|---|
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B2 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,006,129 B1 | 2/2006 | McClure |
| 7,012,543 B2 | 3/2006 | DeLine et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | DeLine et al. |
| 7,321,112 B2 | 1/2008 | Stam et al. |
| 7,329,013 B2 | 2/2008 | Blank et al. |
| 7,417,221 B2 | 8/2008 | Creswick et al. |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | DeLine et al. |
| 7,683,326 B2 | 3/2010 | Stam et al. |
| 7,711,479 B2 | 5/2010 | Taylor et al. |
| 7,719,408 B2 * | 5/2010 | DeWard ............... B60R 11/04 340/425.5 |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | DeLine et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,482,683 B2 | 7/2013 | Hwang et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051624 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |

(56) References Cited

U.S. PATENT DOCUMENTS

| | | |
|---|---|---|
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2004/0267419 A1 | 12/2004 | Jeng |
| 2005/0078389 A1 | 4/2005 | Kulas et al. |
| 2005/0140855 A1 | 6/2005 | Utsumi |
| 2005/0225633 A1 | 10/2005 | Diederiks et al. |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2006/0235753 A1* | 10/2006 | Kameyama .......... B60H 1/00742 705/15 |
| 2007/0153085 A1* | 7/2007 | Chang .................. B60R 1/00 348/148 |
| 2007/0171037 A1 | 7/2007 | Schofield et al. |
| 2008/0068520 A1 | 3/2008 | Minikey, Jr. et al. |
| 2008/0087797 A1 | 4/2008 | Turnbull et al. |
| 2008/0158357 A1 | 7/2008 | Connell et al. |
| 2008/0192132 A1 | 8/2008 | Bechtel et al. |
| 2008/0247192 A1 | 10/2008 | Hoshi et al. |
| 2008/0291275 A1 | 11/2008 | Hubert et al. |
| 2008/0294315 A1 | 11/2008 | Breed |
| 2009/0015736 A1 | 1/2009 | Weller et al. |
| 2009/0021583 A1 | 1/2009 | Salgar et al. |
| 2009/0141516 A1 | 6/2009 | Wu et al. |
| 2009/0295181 A1* | 12/2009 | Lawlor .................. B60R 1/12 296/1.11 |
| 2010/0201896 A1 | 8/2010 | Ostreko et al. |
| 2013/0009761 A1 | 1/2013 | Horseman |
| 2013/0028473 A1 | 1/2013 | Hilldore et al. |
| 2013/0030811 A1* | 1/2013 | Olleon .................. B60K 35/00 704/267 |
| 2013/0063598 A1 | 3/2013 | Hsiao et al. |
| 2013/0279014 A1 | 10/2013 | Fish, Jr. et al. |
| 2014/0022390 A1 | 1/2014 | Blank et al. |
| 2014/0055616 A1 | 2/2014 | Corcoran et al. |
| 2014/0078044 A1* | 3/2014 | Yamashita .......... B60K 35/00 345/156 |
| 2014/0091915 A1 | 4/2014 | Barros |
| 2014/0247390 A1* | 9/2014 | Ohsumi ................ B60R 11/04 348/373 |
| 2014/0313337 A1* | 10/2014 | Devota ................ B60R 11/04 348/148 |
| 2014/0347488 A1 | 11/2014 | Tazaki et al. |
| 2015/0009010 A1* | 1/2015 | Biemer .................. G06F 21/32 340/5.83 |
| 2016/0006911 A1* | 1/2016 | Kimura ................ H04N 5/2252 348/47 |
| 2016/0137126 A1* | 5/2016 | Fursich .................. B60R 1/00 348/38 |

FOREIGN PATENT DOCUMENTS

| | | |
|---|---|---|
| GB | 2338363 | 12/1999 |
| JP | S62-123578 U | 2/1989 |
| JP | 1178693 | 3/1999 |
| JP | 2002-538470 A | 11/2002 |
| JP | 2005148119 | 6/2005 |
| JP | 2005327600 | 11/2005 |
| JP | 2008139819 A | 6/2008 |
| JP | 2014-201146 A | 10/2014 |
| WO | 9621581 | 7/1996 |
| WO | 2007103573 A2 | 9/2007 |
| WO | 2010090964 | 8/2010 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al, "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications,"Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

* cited by examiner

FIG. 3A
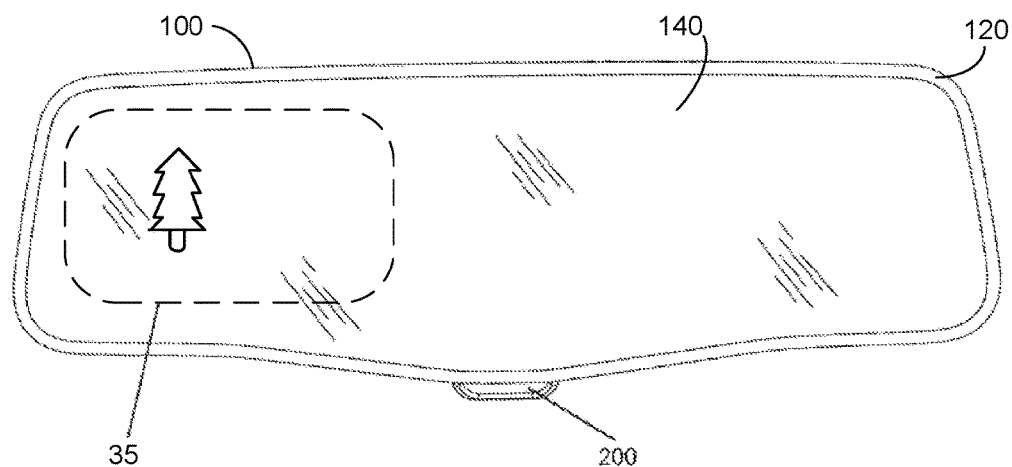
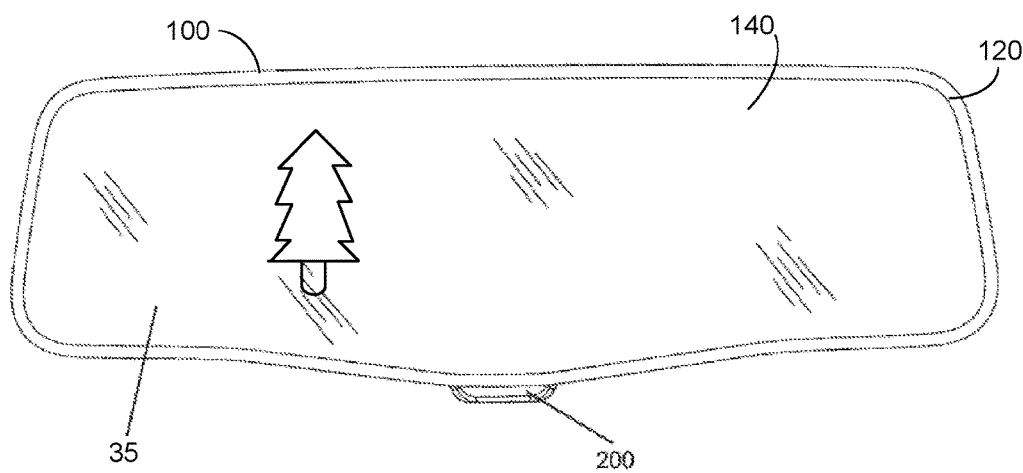
FIG. 3B

VEHICLE VISION SYSTEM HAVING ADJUSTABLE DISPLAYED FIELD OF VIEW

CROSS-REFERENCE TO RELATED APPLICATION

This application is a continuation of U.S. patent application Ser. No. 14/978,635 filed Dec. 22, 2015, now U.S. Pat. No. 9,744,907, which claims priority to and the benefit under 35 U.S.C. § 119(e) of U.S. Provisional Patent Application No. 62/097,315, filed on Dec. 29, 2014, entitled "VEHICLE VISION SYSTEM HAVING ADJUSTABLE DISPLAYED FIELD OF VIEW," the entire disclosure of which is hereby incorporated herein by reference.

FIELD OF THE INVENTION

The present invention generally relates to a vehicle vision system and, more particularly, a vehicle vision system where a display is movable relative to the vehicle.

SUMMARY OF THE INVENTION

According to one aspect of the present invention, a vehicle display system is provided for displaying images captured by a camera associated with a vehicle, wherein the camera has a field of view. The display system comprises a rearview assembly and a processing circuit. The rearview assembly comprises a mounting structure configured for mounting to the vehicle; a movable head pivotably attached to the mounting structure; a display device positioned within the movable head for displaying a portion of the field of view of the camera; and a movement sensor for sensing movement of the movable head. The processing circuit is in communication with the movement sensor and the display device for selecting the portion of the field of view to be displayed on the display device in response to movement of the movable head as sensed by the movement sensor.

According to another aspect of the present invention, a vision system for a vehicle is provided comprising a camera for capturing images within a field of view; a display device movably mounted relative to the vehicle for displaying a portion of the field of view of the camera; a movement sensor for sensing movement of the display device; and a processing circuit in communication with the movement sensor, the display device, and the camera for selecting the portion of the field of view to be displayed on the display device in response to movement of the display device as sensed by the movement sensor.

According to another aspect of the present invention, a vehicle display system is provided for displaying images captured by a camera associated with a vehicle, wherein the camera has a field of view. The display system comprises a user input; a display device for displaying a portion of the field of view of the camera; and a processing circuit in communication with the user input and the display device for selecting the portion of the field of view to be displayed on the display device in response to movement of the user input.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 3A is a front elevational view of a rearview assembly including a reverse camera display;

FIG. 3B is a front elevational view of a rearview assembly including a full display mirror;

DETAILED DESCRIPTION OF THE EMBODIMENTS

Figure 1:
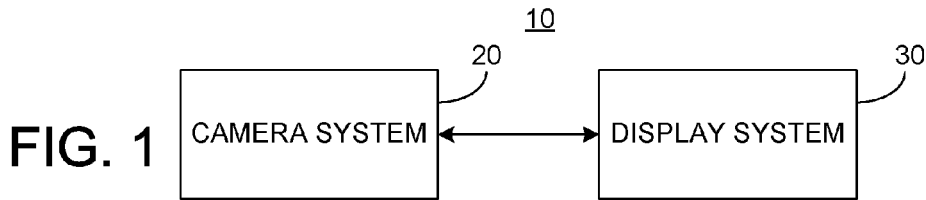
FIG. 1 is an electrical diagram in block form of a vehicle vision system.

The present illustrated embodiments reside primarily in combinations of method steps and apparatus components related to a vehicle vision system, particularly one having a display device in a vehicle rearview assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIGS. 3A and 3B. Unless stated otherwise, the term "front" shall refer to the surface of the element closer to an intended viewer of the rearview assembly, and the term "rear" shall refer to the surface of the element further from the intended viewer of the rearview assembly. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The embodiments described herein relate to a vehicle vision system. Vehicle vision systems are known in which a camera is mounted to a vehicle for capturing images for display on a display device positioned in the vehicle for viewing by the driver of the vehicle. In some of these vehicle vision systems, the display is located in the inside rearview mirror assembly. Such displays may be smaller in size than the mirror element and positioned behind the mirror element such that images generated by the display may be seen through the mirror element when the display is activated. Further, the mirror element may be transflective so as to hide the display when not activated. In some such vision systems, the function of the display is that of a reverse camera display (RCD) in which the display is activated when the vehicle is placed in reverse and displays images from a rearward facing camera for as long as the vehicle remains in reverse or for a predetermined time thereafter. These RCDs typically have a viewing area less than that of the mirror element. Examples of RCDs are described in U.S. Pat. No. 8,339,526 and United States Patent Application Publication No. US 2009/0096937 A1, the entire disclosures of which are incorporated by reference.

Some vehicle vision systems are designed to have a display that has an area substantially corresponding to the mirror element. In these systems the display is configured to display images from a rearward-facing camera whenever activated by the driver. Examples of these "full display mirrors" (FDMs) are described in U.S. Pat. No. 8,339,526; and United States Patent Application Publication Nos. US 2009/0096937 A1, US 2015/0266427 A1, and US 2015/0277203 A1, the entire disclosures of which are incorporated by reference.

In vehicle vision systems it may be desired from an acceptance standpoint to have the displayed images simulate the images one would see from reflections from a conventional mirror. On the other hand, it may be desirable from a safety standpoint to display a greater field of view than would be seen with a conventional mirror. This latter objective is possible insofar as the camera is typically mounted outside the vehicle so as to not have its field of view obscured by objects in the vehicle or the rear pillars of the vehicle that are adjacent the rear window. To accommodate these seemingly incompatible goals, the embodiments described herein allow the driver to select the field of view to be displayed. As described below, this may be accomplished by changing the field of view as the driver moves the mirror housing or as the driver manipulates a user input. The change in field of view may be performed in a manner that simulates the change in field of view that the driver would otherwise experience when moving a conventional mirror housing.

An example of a vehicle vision system 10 is shown in FIG. 1. As shown, vehicle vision system 10 includes a camera system 20 and a display system 30. The camera system 20 and display system 30 are shown as two separate systems insofar as they may be located in separate locations of the vehicle and disposed in different vehicle components or accessories. For example, as described further below, display system 30 may be disposed in a rearview assembly 100 (FIGS. 3A, 3B, and 5) whereas camera system 20 may be disposed at the rear and/or sides of the vehicle.

Figure 2A:
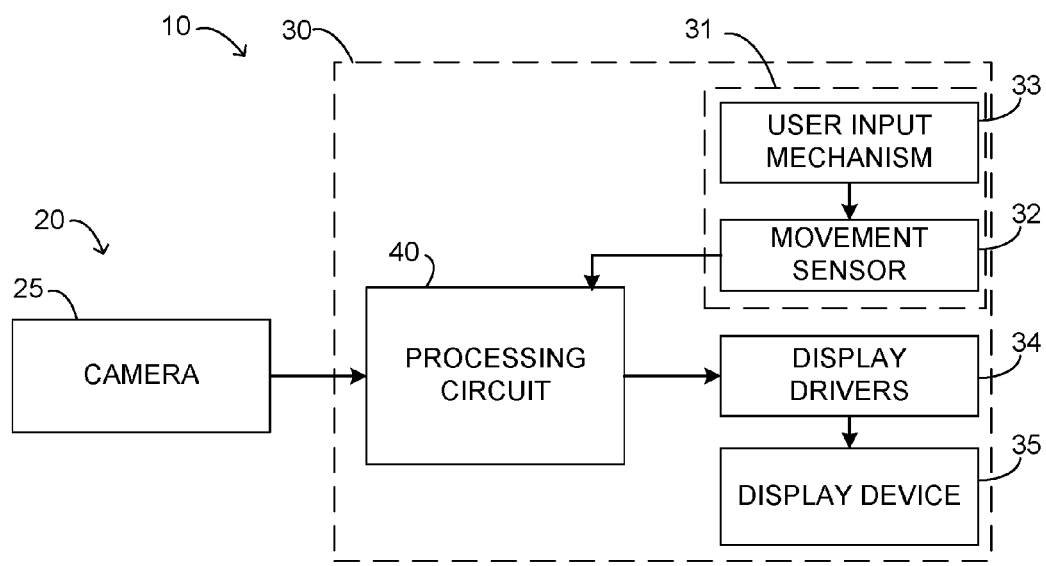
FIG. 2A is an electrical diagram in block form of a more detailed vehicle vision system according to one implementation.
Figure 2B:
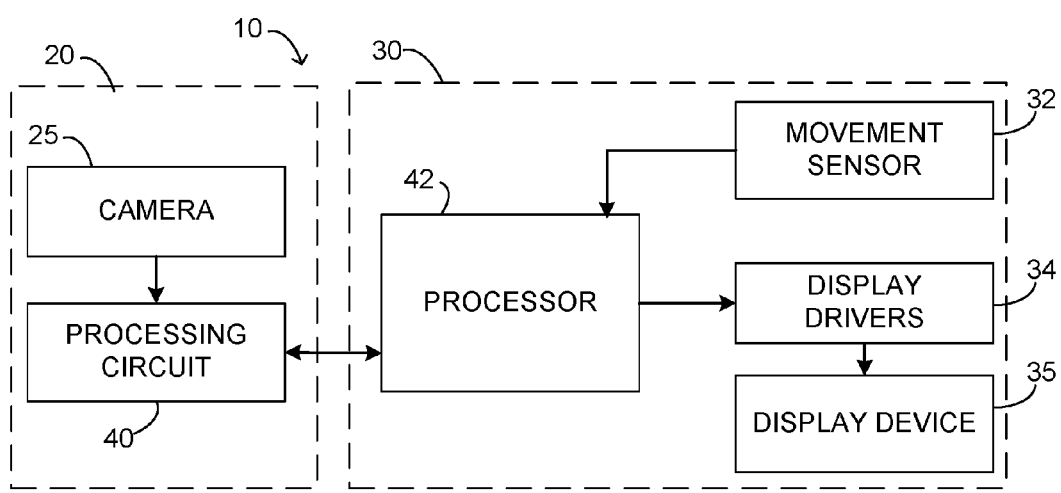
FIG. 2B is an electrical diagram in block form of a more detailed vehicle vision system according to an alternative implementation.

FIGS. 2A and 2B show two different implementations of the embodiments described herein. In the implementation shown in FIG. 2A, camera system 20 includes a camera 25 that captures images of a field of view. Display system 30 includes a movement sensor 32, display drivers 34, a display device 35, and a processing circuit 40. Display device 35 is configured to display a portion of the field of view captured by the camera. Display system 30 may be wholly or partially disposed in the vehicle such that display device 35 is movably mounted relative to the vehicle. Movement sensor 32 is provided for sensing movement of display device 35. As described in detail below, processing circuit 40 is in communication with movement sensor 32, display device 35 (via display drivers 34), and camera 25 for selecting the portion of the field of view to be displayed on display device 35 in response to movement of display device 35 as sensed by movement sensor 32.

The implementation shown in FIG. 2B differs from the implementation shown in FIG. 2A in that processing circuit 40 is part of camera system 20 and may therefore be located in the same vehicle component or accessory as camera 25. In this implementation, processing circuit 40 receives output from movement sensor 32 via a vehicle bus or discrete connection, and selects the portion of the field of view to be displayed on display device 35 in response to movement of display device 35 as sensed by movement sensor 32. An optional processor 42 may be provided in display system 30 to facilitate communication with processing circuit 40 and to perform any other processing functions for the component in which display system 30 is disposed. For example, if provided in a rearview assembly, processor 42 may be configured to compute a heading from compass sensors, control dimming of an electro-optic mirror element, or perform any other function commonly executed by a processor in a mirror housing. Although shown as being part of either camera system 20 or display system 30, processing circuit 40 may be located separate from either system.

As mentioned above, display system 30 may be mounted in a rearview assembly 100. As shown in FIG. 3A, rearview assembly 100 may include display device 35 disposed in a mirror housing 120 and positioned and sized so as to function as an RCD in which the display area is smaller than the total viewable area of the rearview assembly. Rearview assembly 100 may include a mirror element 140 disposed in mirror housing 120 in front of or behind display device 35 such that rearview assembly 100 functions as a rearview mirror assembly. Mirror element 140 may include a transmissive window 141 (FIG. 5) in front of display device 35 such that displayed images from display device 35 may be seen through mirror element 140. Mirror element 140 may be transflective over its entire viewable area or within window 141 such that display device 35 is hidden when not activated.

As shown in FIG. 3B, rearview assembly 100 may include display device 35 disposed in mirror housing 120 and positioned and sized so as to function as an FDM in which the display area is substantially the same size as the total viewable area of the rearview assembly. Mirror element 140 may be transflective over its entire viewable area such that display device 35 is hidden when not activated. For both RCD and FDM versions of rearview assembly 100, a user-actuated switch 200 may be provided for activating or deactivating display device 35 in the manner disclosed in United States Patent Application Publication Nos. US 2009/0096937 A1, US 2015/0266427 A1 and US 2015/0277203 A1, the entire disclosures of which are incorporated herein by reference. To the extent that user activation of switch 200 may cause movement of display device 35, any movement sensed by movement sensor 32 may be overridden if actuation of switch 200 is detected since such actuation would otherwise deactivate display device 35 or activate it from a previously deactivated state.

Figure 4A:
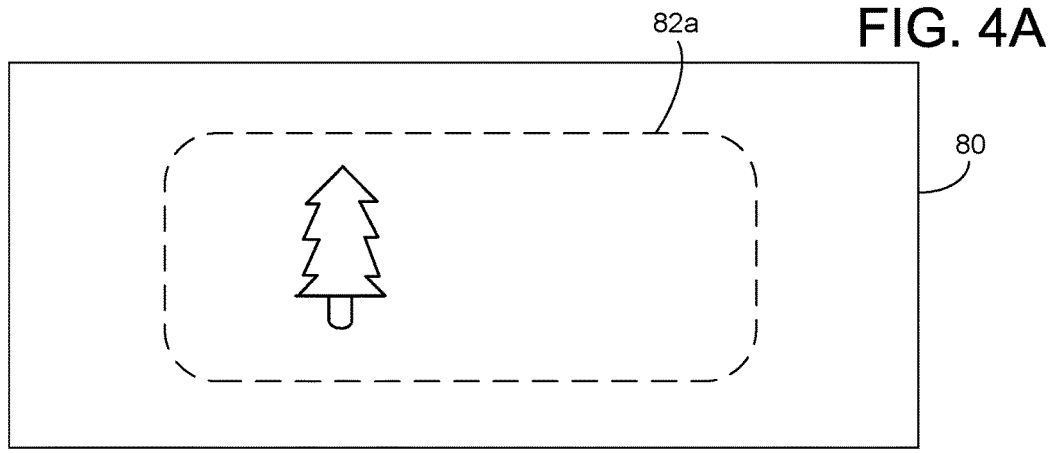
FIG. 4A is an illustration of a mirror image of a camera field of view with a display field of view superimposed in a first position.
Figure 4B:
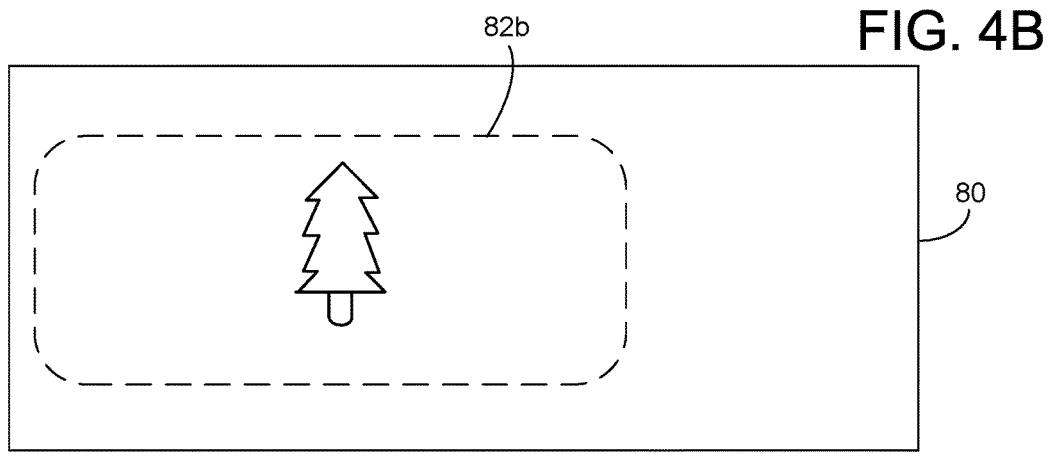
FIG. 4B is an illustration of a mirror image of a camera field of view with a display field of view superimposed in a second position.
Figure 4C:
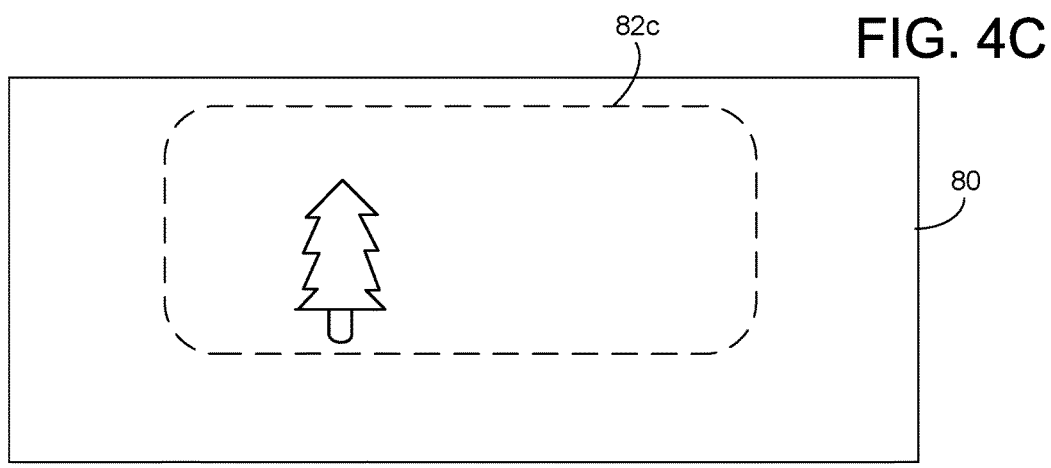
FIG. 4C is an illustration of a mirror image of a camera field of view with a display field of view superimposed in a third position.

FIG. 4A shows an example of a mirror-imaged (or reversed) field of view 80 of camera 25 with a portion 82a of field of view 80 shown in dashed lines. The portion 82a is intended to show the portion of the field of view that is displayed on display device 35. As illustrated, the camera field of view 80 is larger than the portion 82a to be displayed. As explained above, it may be desirable to simulate a rearview mirror, particularly when the display is configured as an FDM. Because a rearward-facing camera captures images directly to the rear as opposed to a mirror image as would be seen by a driver, it may be desirable to reverse the images captured by the camera before displaying on display 35 so that the displayed images appear as they would when reflected from a mirror. Further, in a rearview mirror assembly with just a mirror element, movement of the mirror housing 120 changes the field of view as seen by the driver. However, in conventional FDMs, movement of the mirror housing does not cause the displayed field of view to change as the camera remains stationary relative to the vehicle. Accordingly, processing circuit 40 is provided and configured to select the portion 82a of the camera field of view 80 that is to be displayed on display device 35 in response to any movement sensed by movement sensor 32. Thus, for example, in response to horizontal rotation of mirror housing 120, processing circuit 40 shifts the displayed field of view by selecting a portion 82b (FIG. 4B) of field of view 80 that is horizontally shifted from the prior displayed portion 82a (FIG. 4A). The portion displayed may be gradually and continuously shifted to mimic the change in field of view if moving a mirror element in the same manner. Similarly, in response to vertical tilting of mirror housing 120, processing circuit 40 shifts the displayed field of view by selecting a portion 82c (FIG. 4C) of field of view 80 that is vertically shifted from the prior portion 82a (FIG. 4A).

Although a single field of view of a single camera is described above, the field of view 80 may be a composite field of view from multiple cameras with the images merged together to form one seamless panoramic image. Thus, movement of mirror housing 120 may enable or disable different cameras or otherwise select from the fields of view of particular cameras such that movement of mirror housing 120 causes the field of view of display device 35 to effectively pan across the much larger panoramic field of view. It should be noted that a user-selectable mechanism may also be provided to allow a driver to zoom in or out the displayed field of view.

It should further be appreciated that the displayed field of view may be varied through movement of the mirror housing 120 by causing the camera 25 to pan and tilt if capable of doing so.

Figure 5:
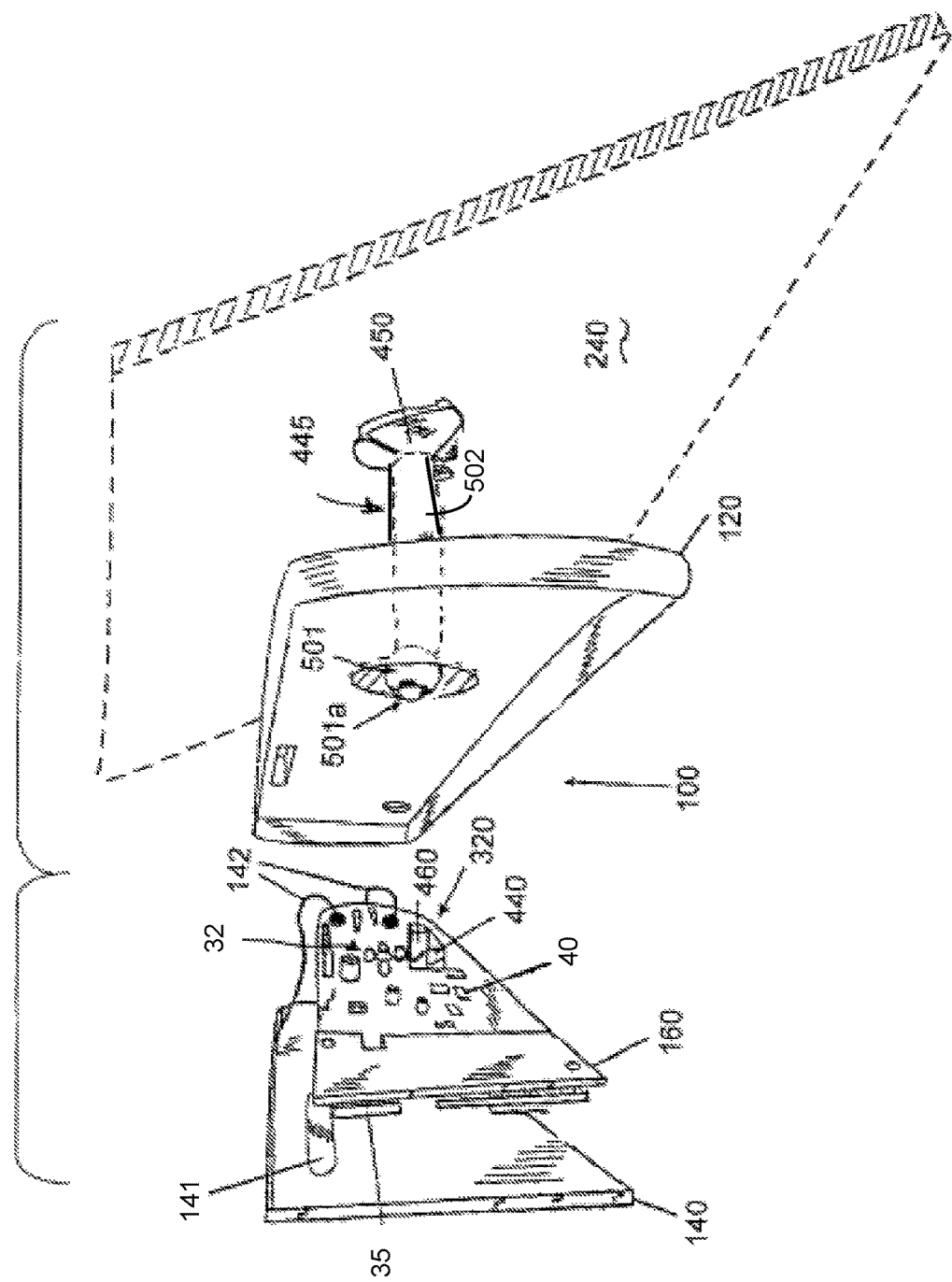
FIG. 5 is an exploded view of a rearview assembly.

FIG. 5 shows an exploded view of an exemplary rearview assembly 100. As shown, rearview assembly 100 includes mirror housing 120, a mounting structure 445 for pivotally mounting mirror housing 120 to the vehicle such that mirror housing 120 may be both vertically and horizontally tilted relative to the vehicle. In FIG. 5, reference numeral 240 represents a windshield of the vehicle to which a mounting foot 450 of mounting structure 445 may be secured. It will be understood by those skilled in the art that mounting structure 445 may alternatively be secured to the roof structure of the vehicle above the windshield. In some applications, a single ball mount is preferable so that measurements of the rotational position on the single ball accurately indicate the position of the mirror in the vehicle. Mounting structure 445 further includes a mounting ball 501 and a mounting stem 502 extending between ball 501 and mounting foot 450.

Mirror element 140 is mounted in mirror housing 120. An optional compass sensor 320 may be disposed in mirror housing 120 and coupled to processing circuit 40 (or processor 42). Compass sensor 320 generally includes an X-axis magnetic field sensor 440, a Y-axis magnetic field sensor 460, and an optional Z-axis sensor (not shown). Sensors 440 and 460, as well as processing circuit 40, may be mounted on a printed circuit board 160.

Display device 35 is fixedly mounted in mirror housing 120 and may either be mounted on a front surface of printed circuit board 160 or to the rear surface of the mirror element so as to project light through a window portion 141 provided in the reflective surface of mirror element 140. Display device 35 may alternatively be mounted on a daughter circuit board (not shown). Further, display device 35 may be mounted in front of mirror element 140.

Mirror element 140 may be an electro-optic mirror. The sensors and circuitry for automatically varying the transmittance and hence reflectivity of electro-optic mirror element 140 may also be mounted on printed circuit board 160. Such circuitry may be coupled to mirror 140 via wires 142 in any conventional manner.

As mentioned above, rearview assembly 100 further includes movement sensor 32 for detecting when mirror housing 120 and hence display device 35 have been moved from a prior position. Movement sensor 32 then generates and transmits a movement detection signal to processing circuit 40 such that processing circuit 40 may take into account the fact that the mirror housing 120 and hence display device 35 have been tilted when selecting a portion of the camera field of view to display.

Movement sensor 32 may have any configuration capable of sensing movement of mirror housing 120. Examples of movement sensors for sensing movement of a mirror housing are disclosed in U.S. Pat. No. 6,140,933, the entire disclosure of which is incorporated by reference. An example of one such movement sensor disclosed in U.S. Pat. No. 6,140,933 is described below with reference to FIGS. 6A-6C.

Figure 6A:
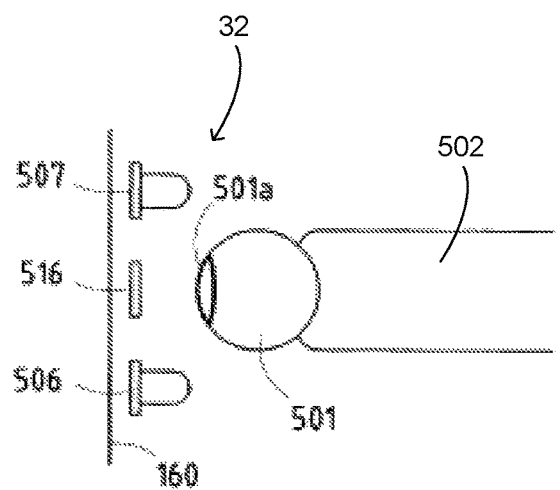
FIG. 6A is a side elevational view of a movement sensor used in the rearview assembly of FIG. 5.
Figure 6C:
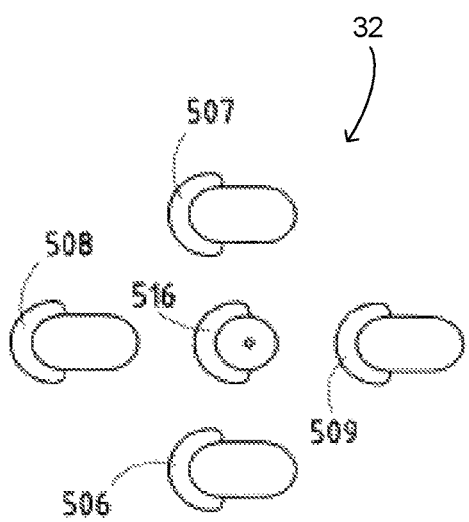
FIG. 6C is a perspective view of the movement sensor shown in FIGS. 6A and 6B.
Figure 6B:
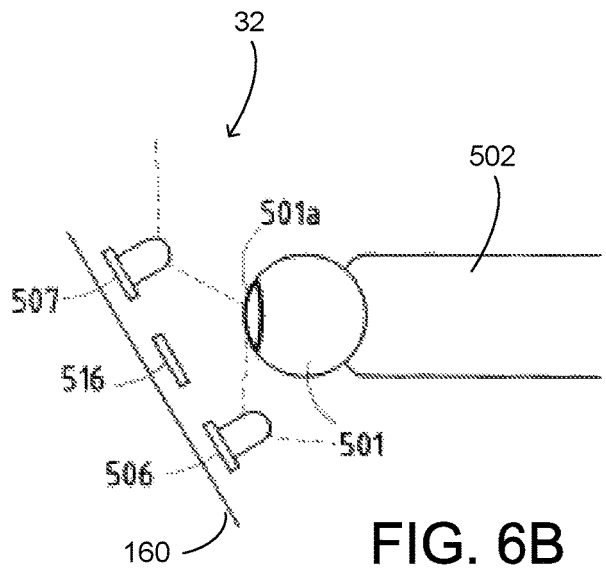
FIG. 6B is another side elevational view of the movement sensor shown in FIG. 6A.

In FIGS. 6A and 6B, a pivot ball 501 for a single ball mirror mount 445 (FIG. 5), a portion of circuit board 160, and the components used to measure the position of the mirror housing 120 on the mount are shown. Ball 501 is attached to the automobile by stem 502 via a mounting bracket 450 (FIG. 5). The assembly is viewed from the side. A target 501a is provided on the pivot ball 501. Two of four LEDs, 506 and 507, are shown in FIGS. 6A and 6B, and are respectively disposed below and above a sensor 516 and are used for sensing vertical movement of mirror housing 120. These LEDs may be momentarily lighted one at a time, and the light individually reflected off of target 501a by each of the LEDs is measured by sensor 516, which may be a photodiode. As shown in FIG. 6C, movement sensor 32 may further include LEDs 508 and 509 laterally disposed on either side of sensor 516 for sensing horizontal movement of mirror housing 120.

Target 501a may be a white spot provided on a black or dark ball 501. Conversely, the target could be a black spot on a white or highly reflective ball 501. Basically, the target can be any color that contrasts with the mirror ball, where "color" is defined as the reflectance at the light spectrum being used. In general, it is the contrast difference between the target region 501*a* and the surrounding area that is being measured. The target can be painted on ball 501, a separate plastic member, an adhesive sticker, or even a variation in surface texture of ball 501. Additionally, a void can be molded into ball 501 that appears as a black target on a light background. Further, ball 501 may be made of metal and have a portion mirrored to serve as target 501*a*.

Movement sensor 32 may also be provided by way of a magnetic field sensor such as a three-axis compass sensor provided in the mirror housing 120 as disclosed in U.S. Pat. No. 6,928,366, the entire disclosure of which is incorporated by reference. It may also be desirable to provide capacitive touch sensors at locations on the top and bottom of mirror housing 120 where a driver is likely to grasp mirror housing 120 for purposes of moving it. Such capacitive touch sensors would thus provide additional information for processing circuit 40 to ascertain that the mirror housing 120 has been moved by the driver.

Although the embodiments are described above as being adapted for use with an interior rearview assembly, the display device may likewise be positioned in an exterior rearview assembly. In this case, because most vehicles do not require a driver to physically move an outside mirror element, movement sensor 32 (FIG. 1) may be part of a user input 31 so as to sense movement of a user input mechanism 33. User input mechanism 33 may take the form of any conventional mechanism used to move outside mirrors such as a joystick or multiple switches for moving the mirror element right, left, up, and down. Movement sensor 32 may thus be configured differently depending upon the form of user input mechanism 33 that is used and may be constructed in the same manner as for conventional mirror position switches. The main difference between this arrangement and conventional arrangements is that processing circuit 40 responds to user input 31 by selecting the portion of the field of view to be displayed on display device 35. This may avoid the need for a motor pack that would otherwise be required to physically move a conventional exterior mirror element.

Although the use of such input 31 has been described with respect to exterior mirror assemblies, user input 31 may be provided to adjust the field of view shown on display device 35 when positioned in an interior location such as the interior rearview assembly 100 described above. Moreover, the same user input 31 may be used for interior rearview assembly 100 and both exterior assemblies by providing a selector switch so as to select the display on which the field of view is to be adjusted.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A vehicle display system for displaying images captured by a camera associated with a vehicle, wherein the camera has a field of view, the display system comprising:
   a rearview assembly comprising:
      a mounting structure configured for mounting to the vehicle;
      a movable head pivotably attached to said mounting structure;
      a display device positioned within said movable head for displaying a portion of the field of view of the camera;
      a movement sensor for sensing movement of said movable head;
      at least one capacitive touch sensor disposed on said movable head; and
   a processing circuit in communication with said at least one capacitive touch sensor, said movement sensor, and said display device for adjusting a field of view to be displayed on said display device in response to movement of said movable head as sensed by said movement sensor and in response to activation of the at least one capacitive touch sensor.

2. The vehicle display system of claim 1, wherein the at least one capacitive touch sensor includes a first capacitive touch sensor disposed along a top of the movable head and a second capacitive touch sensor disposed along a bottom of the movable head.

3. The vehicle display system of claim 1, wherein said processing circuit shifts the field of view horizontally when said movable head is moved horizontally.

4. The vehicle display system of claim 1, wherein said processing circuit shifts the field of view vertically when said movable head is moved vertically.

5. The vehicle display system of claim 1, wherein said mounting structure includes a ball for mounting to said movable head, said movement sensor comprises:
   a target provided on an area of said ball of said mounting structure, said target having a different visual characteristic than other surrounding areas of said ball;
   a light source for projecting light onto said ball; and
   a photodetector for detecting the level of light reflected from said ball,
   wherein said processing circuit is coupled to said photodetector for sensing movement of said movable head when the level of reflected light detected by said photodetector changes.

6. The vehicle display system of claim 1 and further comprising a mirror element disposed in said movable head, wherein said display device is positioned adjacent said mirror element.

7. The vehicle display system of claim 1, wherein said processing circuit is mounted in said movable head.

8. A vision system for a vehicle comprising:
   a camera for capturing images within a field of view;
   a display device movably mounted relative to the vehicle for displaying a portion of the field of view of said camera;
   a movement sensor for sensing movement of said display device;
   a first capacitive touch sensor disposed along a top of the display device;
   a second capacitive touch sensor disposed along a bottom of the display device; and
   a processing circuit in communication with the first and second capacitive touch sensors, said movement sensor, said display device, and said camera for adjusting a field of view to be displayed on said display device in response to movement of said display device as sensed by said movement sensor and in response to activation of at least one of the first and second capacitive touch sensors.

9. The vision system of claim 8, wherein said display device is disposed in a mirror housing of a rearview mirror assembly, and wherein said movement sensor senses movement of said display device by sensing movement of said mirror housing.

10. The vision system of claim 9, wherein said processing circuit is disposed in said mirror housing.

11. The vision system of claim 8, wherein said processing circuit shifts the field of view horizontally when said display device is moved horizontally.

12. The vision system of claim 8, wherein said processing circuit shifts the field of view vertically when said display device is moved vertically.

13. The vision system of claim 9, wherein said rearview mirror assembly comprises a mounting structure configured for mounting to the vehicle, said mounting structure includes a ball for mounting to said mirror housing, wherein said movement sensor comprises:

a target provided on an area of said ball of said mounting structure, said target having a different visual characteristic than other surrounding areas of said ball;

a light source for projecting light onto said ball; and a photodetector for detecting the level of light reflected from said ball, wherein said processing circuit is coupled to said photodetector for sensing movement of said mirror housing when the level of reflected light detected by said photodetector changes.

14. The vision system of claim 9 and further comprising a mirror element disposed in said mirror housing, wherein said display device is positioned adjacent said mirror element.

15. The vision system of claim 8, wherein said camera is mounted in a camera module disposed at a rear of the vehicle.

16. The vision system of claim 15, wherein said processing circuit is disposed in the camera module.

17. The vision system of claim 9, wherein said movement sensor comprises a magnetic field sensor provided in said mirror housing.

18. An exterior rearview display system for a vehicle for displaying images captured by a camera associated with the vehicle, wherein the camera has a field of view, the exterior rearview display system comprising:

a user input located on the interior of a vehicle;

a display device for displaying a portion of the field of view of said camera, the display device disposed on an exterior of the vehicle; and a processing circuit in communication with said user input and said display device for selecting the portion of the field of view to be displayed on said display device in response to said user input.

19. The exterior rearview display system of claim 18, wherein said processing circuit shifts the portion of the field of view both horizontally and vertically in response to said user input.

* * * * *